United States Patent
Zeng et al.

(10) Patent No.: US 11,967,130 B2
(45) Date of Patent: Apr. 23, 2024

(54) METHOD FOR DETERMINING SIMILARITY OF ADJACENT ROWS IN A PICTURE AND DISPLAY DEVICE

(71) Applicant: HKC CORPORATION LIMITED, Guangdong (CN)

(72) Inventors: Dekang Zeng, Guangdong (CN); Shuixiu Hu, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 689 days.

(21) Appl. No.: 17/253,075

(22) PCT Filed: Dec. 26, 2018

(86) PCT No.: PCT/CN2018/123804
§ 371 (c)(1),
(2) Date: Dec. 16, 2020

(87) PCT Pub. No.: WO2020/124631
PCT Pub. Date: Jun. 25, 2020

(65) Prior Publication Data
US 2021/0133946 A1     May 6, 2021

(30) Foreign Application Priority Data
Dec. 19, 2018   (CN) .......................... 201811558933.7

(51) Int. Cl.
*G06V 10/60*     (2022.01)
*G06F 18/22*     (2023.01)
(Continued)

(52) U.S. Cl.
CPC ............. *G06V 10/60* (2022.01); *G06F 18/22* (2023.01); *G06T 7/001* (2013.01); *G06V 10/56* (2022.01);
(Continued)

(58) Field of Classification Search
CPC ...... G06V 10/443; G06V 10/56; G06V 10/60; G06V 10/751; G06V 20/46; G06V 20/588;
(Continued)

(56) References Cited

U.S. PATENT DOCUMENTS

| 10,674,178 B2 * | 6/2020 | Winetraub ............. H04N 5/145 |
| 2003/0146896 A1 | 8/2003 | Hiroyuki et al. |

(Continued)

FOREIGN PATENT DOCUMENTS

| CN | 1681293 A | 10/2005 |
| CN | 101639858 A | 2/2010 |

(Continued)

OTHER PUBLICATIONS

Chia-Hao Fang, et al; "Absolute Difference and Low-Power Bus Encoding Method for LCD Digital Display Interfaces", Hindawi Publishing Corporation, VLSI Design, vol. 2012, Article ID 657897, 6 pages, Published Dec. 6, 2012.

(Continued)

*Primary Examiner* — Michael P Stafira
(74) *Attorney, Agent, or Firm* — Westbridge IP LLC

(57) ABSTRACT

A method for determining similarity of adjacent rows in a picture, the method includes obtaining feature value of corresponding sub-pixel of each row of picture data in a frame of picture data; subtracting feature values of corresponding sub-pixels of two adjacent rows of picture data in the frame of picture data, and summing absolute values of multiple differences obtained from subtracting; and determining similarity of the two adjacent rows of picture data in the frame of picture data according to the summed value. The present application further provides a display device, the display device includes an apparatus for determining two (Continued)

adjacent rows in a picture, the apparatus includes processor and memory for implementing steps of the above methods.

20 Claims, 4 Drawing Sheets

(51) Int. Cl.
*G06T 7/00* (2017.01)
*G06V 10/56* (2022.01)
*G06V 10/75* (2022.01)

(52) U.S. Cl.
CPC .. *G06V 10/751* (2022.01); *G06T 2207/10024* (2013.01); *G06T 2207/30121* (2013.01)

(58) Field of Classification Search
CPC ...... G06V 10/82; G06V 20/53; G06V 30/412; G06V 30/413; G06V 30/414; G06V 10/242; G06V 10/25; G06V 10/422; G06V 10/44; G06V 10/74; G06V 10/754; G06V 10/761; G06V 10/806; G06V 20/17; G06V 20/40; G06V 20/41; G06V 20/48; G06V 30/10; G06V 30/1478; G06V 30/15; G06V 30/19093; G06V 40/103; G06V 40/20; G06V 40/23; G06T 11/206; G06T 2200/24; G06T 7/0012; G06T 11/60; G06T 2207/20104; G06T 3/40; G06T 1/00; G06T 2207/30048; G06T 5/003; G06T 7/12; G06T 7/246; G06T 7/62; G06T 9/001; G06T 2207/10024; G06T 2207/20201; G06T 3/4023; G06T 7/11; G06T 2207/30096; G06T 2207/30121; G06T 2207/30244; G06T 2207/30252; G06T 7/00; G06T 7/0002; G06T 7/001; G06T 7/32; G06T 7/73; G06T 7/90; G06T 2207/10004; G06T 2207/10056; G06T 2207/10076; G06T 2207/10088; G06T 2207/20016; G06T 2207/30068; G06T 3/4007; G06T 5/00; G06T 7/0016; G06T 7/269; G06T 7/37; G06T 7/74; G06T 7/80; G06T 2207/10012; G06T 2207/10072; G06T 2207/20072; G06T 2207/20168; G06T 2207/30024; G06T 2207/30028; G06T 2207/30052; G06T 2207/30092; G06T 2207/30101; G06T 3/0081; G06T 3/4015; G06T 3/403; G06T 5/20; G06T 7/162; G06T 7/30; G06T 7/33; G06T 7/593
See application file for complete search history.

(56) References Cited

U.S. PATENT DOCUMENTS

| | | | |
|---|---|---|---|
| 2007/0076945 A1* | 4/2007 | Park | G06V 10/7515 382/218 |
| 2012/0281891 A1* | 11/2012 | Fang | G06T 11/005 382/128 |
| 2012/0299895 A1* | 11/2012 | Lin | G09G 3/3655 345/211 |
| 2014/0185938 A1 | 7/2014 | Ken et al. | |
| 2016/0372064 A1* | 12/2016 | Chen | G09G 3/3648 |
| 2017/0345383 A1* | 11/2017 | Yin | G09G 3/3648 |
| 2018/0020231 A1 | 1/2018 | Yonatan et al. | |
| 2018/0357944 A1* | 12/2018 | Tang | G09G 3/3208 |

FOREIGN PATENT DOCUMENTS

| | | | | |
|---|---|---|---|---|
| CN | 103915076 A | * | 7/2014 | |
| CN | 103915076 A | | 7/2014 | |
| CN | 105304048 A | | 2/2016 | |
| CN | 106454509 A | | 2/2017 | |
| CN | 107026998 A | | 8/2017 | |
| CN | 106303496 B | * | 6/2018 | |
| EP | 3159876 A1 | * | 4/2017 | .......... G06F 1/3218 |
| JP | 2018526755 A | * | 9/2018 | |
| WO | WO-2015086076 A1 | * | 6/2015 | .......... G06K 9/4671 |
| WO | WO-2016188094 A1 | * | 12/2016 | ............... G09G 3/20 |
| WO | WO-2018176917 A1 | * | 10/2018 | .......... G09G 3/2074 |
| WO | WO-2019184569 A1 | * | 10/2019 | ............... G06K 9/46 |

OTHER PUBLICATIONS

Jingwen Yan; "Digital Image Processing MATLAB Version", 2 pages.

Haigen Yao et al; "Digital Halftoning Technology" 4 pages, May 19, 2020.

The First Chinese Office Action dated May 28, 2020; Appln. No. 201811558933.7.

The Second Chinese Office Action dated Feb. 3, 2021; Appln. No. 201811558933.7.

International Search Report dated Jun. 28, 2019; PCT/CN2018/123804.

Written Opinion of the International Searching Authority dated Jun. 28, 2019; PCT/CN2018/123804.

Yaoli Wang et al.; "Chromatism Analysis of Multispectral Imaging System Based on AOTF and Hardware Compensation Strategy", Spectroscopy and Spectral Analysis, vol. 36, No. 7, pp. 2306-2311, Jul. 2016.

* cited by examiner

METHOD FOR DETERMINING SIMILARITY OF ADJACENT ROWS IN A PICTURE AND DISPLAY DEVICE

CROSS REFERENCES TO RELATED APPLICATIONS the present application is the National Stage of International Application with No. PCT/CN2018/123804, filed Dec. 26, 2018, which claims the priority of a Chinese patent application numbered CN201811558933.7 titled "Method for Determining similarity of Adjacent Rows in a picture", tiled in the Chinese Patent Office on Dec. 19, 2018, the entire content of which is incorporated herein by reference.

FIELD

The present application relates to the field of picture processing, and more specifically to a method and display device for determining similarity of adjacent rows in a picture.

BACKGROUND

The statements here only provide background information related to the present application, and do not necessarily constitute prior art.

With the rapid development of liquid crystal panels, customer groups have higher and higher requirements for the display taste of liquid crystal panels. Many of improvements in quality are achieved by algorithms. Therefore, the liquid crystal panel industry has derived many algorithms. Different algorithms can lighten the existing defects of liquid crystal panels and improve values of products.

Currently, algorithms in the liquid crystal panel industry includes what is for calculating the similarity in a picture. However, algorithms commonly used for calculating the similarity are qualitative rather than quantitative, and the calculation results are rot accurate.

SUMMARY

According to various embodiments of the present application, a method for determining similarity of adjacent rows in a picture and a display device are provided.

According to one aspect of the present application, there is provided a method for determining similarity of adjacent rows in a picture, the method includes: obtaining feature values of corresponding sub-pixels of each row of picture data in a frame of picture data; subtracting feature values of corresponding sub-pixels of two adjacent rows of picture data in the frame of picture data, and summing absolute values of multiple differences obtained from the subtracting; and determining similarity of the two adjacent rows of picture data in the frame of picture data according to a summed value obtained from the summing.

According to another aspect of the present application, a method for determining similarity of adjacent rows in a picture is provided, the method comprises: obtaining feature values of corresponding sub-pixels of each row of picture data in a frame of picture data, a number of total rows in the frame of picture data being N; subtracting feature values of corresponding sub-pixels of row n and row n−1 of picture data in the frame of picture data, and summing absolute values of multiple differences obtained from the subtracting; determining similarity of the row n and row n−1 of picture data in the frame of picture data according to a summed value obtained from the summing, and judging whether n equates to N, in determining that n equates to N, ending processing, in determining that n is not equal to N, increasing n by 1 that is n=n+1 and returning to "subtracting feature values of corresponding sub-pixels of row n and row n−1 of picture data in the frame of picture data, and summing absolute values of multiple differences obtained from the subtracting", where the initial value of n is 2.

According to another aspect of the present application, there is provided a display device, the display device includes an apparatus for determining similarity of adjacent rows in a picture, the apparatus includes a processor and a memory, and the processor configured to execute a computer program stored in the memory to implement the following steps: obtaining feature values of corresponding sub-pixels of each row of picture data in a frame of picture data; subtracting feature values of corresponding sub-pixels of two adjacent rows of picture data in the frame of picture data, and summing absolute values of multiple differences obtained from the subtracting; and determining similarity of the two adjacent rows of picture data in the frame of picture data according to a summed value obtained from the summing.

The details of one or more embodiments of the present application are set forth in the following drawings and description. Other features, purposes and advantages of the present application will become apparent from the description, drawings and claims.

BRIEF DESCRIPTION OF THE DRAWINGS

For more clearly explanation of the technical solutions in the embodiments or exemplary technologies of the present application, the drawings required in the description of the embodiments or exemplary technologies will be simply introduced as below. Obviously, the drawings described as below are merely some embodiments of the present application. For one of ordinary skilled in the art, the drawings of other embodiments can be obtained based on those drawings without creative work.

DETAILED DESCRIPTION OF THE EMBODIMENTS

For more clear understanding of the purpose, technical solutions, and advantages of the present application, the further description of the present application in detail will be conjunction with the drawings and embodiments as below. It should be understood that the specific embodiments described here are merely used to explain the present application, and not limited thereto.

It should be noted that when an element is referred to as being "disposed on" another element, it can be directly on another element or there are intermediate elements between them. When an element is referred to as being "connected to" another element, it can be directly connected to another element or there are intermediate elements between them. The terms "vertical", "horizontal", "left", "right" and similarity expressions used herein are for explanation only and do not mean it is the only implementation.

Unless otherwise defined, all technical and scientific terms used herein have the same meaning as commonly understood by one of ordinary skilled in the art of the present application. The terms used in the description of the present application herein are only for description of specific embodiments and are not intended to limit the present application. The various technical features in the above embodiments can be combined arbitrarily. For concise of the description, all possible combinations of the technical features in the above embodiments are not described, However, as long as there are no contradiction in the combination of these technical features, all those combinations should be considered to be within the range of this description.

Figure 1:
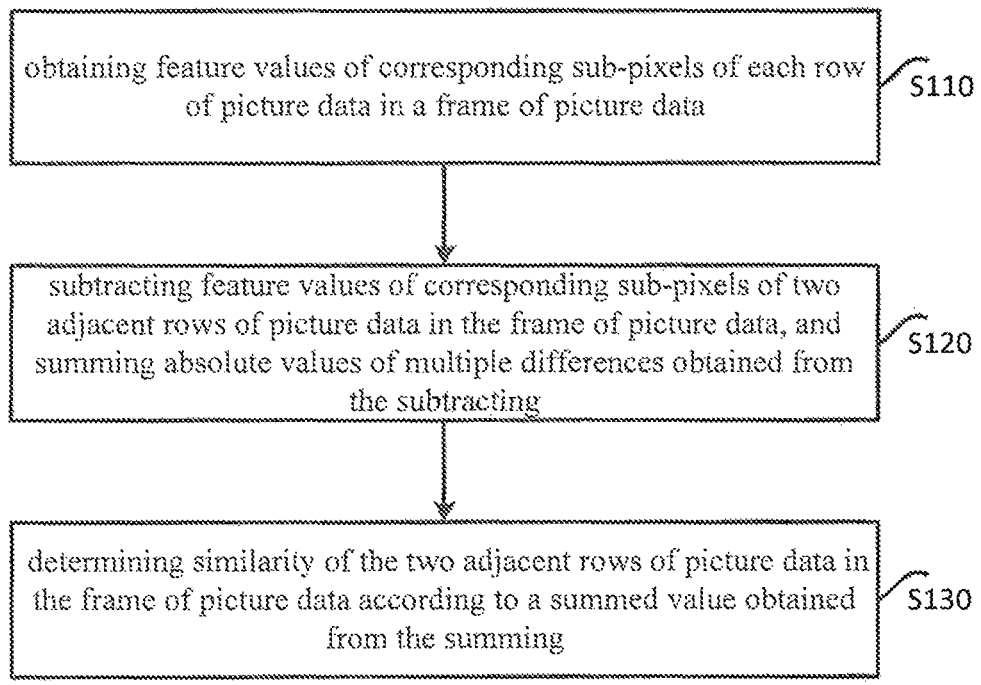
FIG. 1 is a flowchart of a method for determining similarity of adjacent rows in a picture according to an embodiment.

The embodiment of the present application provides a method for determining similarity of adjacent rows in a picture, as shown in FIG. 1, the method can include the following steps:

Step S110, obtaining feature values of corresponding sub-pixels of each row of picture data in a frame of picture data.

Step S120, subtracting feature values of corresponding sub-pixels of two adjacent rows of picture data in the frame of picture data, and summing absolute values of multiple differences obtained from the subtracting.

Step S130, determining similarity of the two adjacent rows of picture data in the frame of picture data according to a summed value obtained from the summing.

Specifically, a frame of picture is a still picture, and continuous frames form animation, such as television pictures, etc. A frame of picture includes multiple rows, each row of picture includes multiple sub-pixels. The feature values of corresponding sub-pixels of each row of picture data in a frame of picture data is obtained for subsequent comparison and calculation, For determining similarity of adjacent rows in a picture, feature values of corresponding sub-pixels of two adjacent rows of picture data in the picture data are subtracted, and absolute values of multiple differences obtained from the subtracting are summed, and then similarity of the two adjacent rows of picture data in the frame of picture data is determined according to a summed value obtained from the summing.

By subtracting feature values of corresponding sub-pixels of two adjacent rows of picture data, and summing absolute values of multiple differences obtained from the subtracting; and determining similarity of the two adjacent rows of picture data according to a summed value obtained from the summing, the above method for determining similarity of adjacent rows in a picture can accurately and quickly determining similarity of two adjacent rows of display data without increasing cost of integrated circuits.

In one of embodiments, a feature value of a sub-pixel can include any one of a gray value, chroma and brightness, etc.

In one of embodiments, a feature value of a corresponding sub-pixel is a gray value of the corresponding sub-pixel. Adopting a gray value as the feature value can easily and quickly calculate a value of the feature value.

In one of embodiments, Step S110, obtaining feature values of corresponding sub-pixels of each row of picture data in a frame of picture data, includes: calculating the gray values of the corresponding sub-pixels of each row of picture data in the frame of picture data to acquire the gray values of corresponding sub-pixels of each row of picture data.

Specifically, feature value of a corresponding sub-pixel can he a gray value of the corresponding sub-pixel, thus Step S110 includes calculation of the gray values of the corresponding sub-pixels of picture data to acquire the gray values of the corresponding sub-pixels of each row of picture data.

In one of embodiments, Step S120, subtracting feature values of the corresponding sub-pixels of the two adjacent rows of picture data in the frame of picture data, and summing absolute values of multiple differences obtained from the subtracting, includes: subtracting the gray values of the corresponding sub-pixels of the two adjacent rows of picture data in the frame of picture data to acquire multiple differences, a number of the multiple differences equaling to a number of the corresponding sub-pixels of each row of picture data in the frame of picture data, and summing absolute values of the multiple differences.

Specifically, after the gray values of corresponding sub-pixels of each row of picture data in a frame of picture data are obtained, and the gray values of the corresponding sub-pixels of the two adjacent rows of picture data are subtracted, thereby obtaining multiple differences, a number of the multiple differences equates to a number of corresponding sub-pixels of a row of picture data. For measuring a difference between the two rows of picture data, absolute values of multiple differences are summed here, and a summed value obtained from the summing represents a total difference between the two rows of picture data.

In one of embodiments, Step S130, determining similarity of the two adjacent rows of picture data in the frame of picture data according to a summed value obtained from the summing includes:

determining similarity of the two adjacent rows of picture data according to a formula: Similar $(n)=(1-(H\_data(n)/(X*255))*100\%$.

After summing absolute values of multiple differences, similarity of the two adjacent rows is determined according to the summed value. Specifically, similarity of the two adjacent rows of picture data can be determined according to a formula Similar$(n)=(1-(H\_data(n)/(X*255))*100\%$, where, Similar(n) is a similarity of row n and row n−1 of picture data in the frame of picture data, n=2, 3 ... N, where N is a number of total rows in the frame of picture data, H_data (n) is a value obtained by summing absolute values of the differences obtained from subtracting gray values of the corresponding sub-pixels of row n and row n−1 of picture data, and X is a number of the sub-pixels of a row of picture data in the frame of picture data. Since a range of gray values is 0-255, a maximum difference between gray values of two sub-pixels is 255. X*255 is a maximum absolute value of differences between the gray values of the two adjacent rows of picture data. A ratio of the summed value and X*255 measures the differences of gray values of the adjacent rows, and 1 subtracting the ratio can measure similar of the adjacent rows. For example, when H_data (n)=X*255, Similar(n) is 0, that is, the adjacent rows are completely different. When H_data(n)=0, Similar(n) is 100%, that is, the adjacent rows are completely identical. When H_data(n) is between 0 and X*255, Similar(n) is between 0 and 100% and represents a similarity of the adjacent rows, the larger the value, the higher similarity of the adjacent rows will be.

The method in the above embodiment can accurately measure similarity of two adjacent rows according to the formula, the calculation process is simple and convenient, the calculation result is intuitive and convenient for subsequent analysis and processing.

Figure 2:
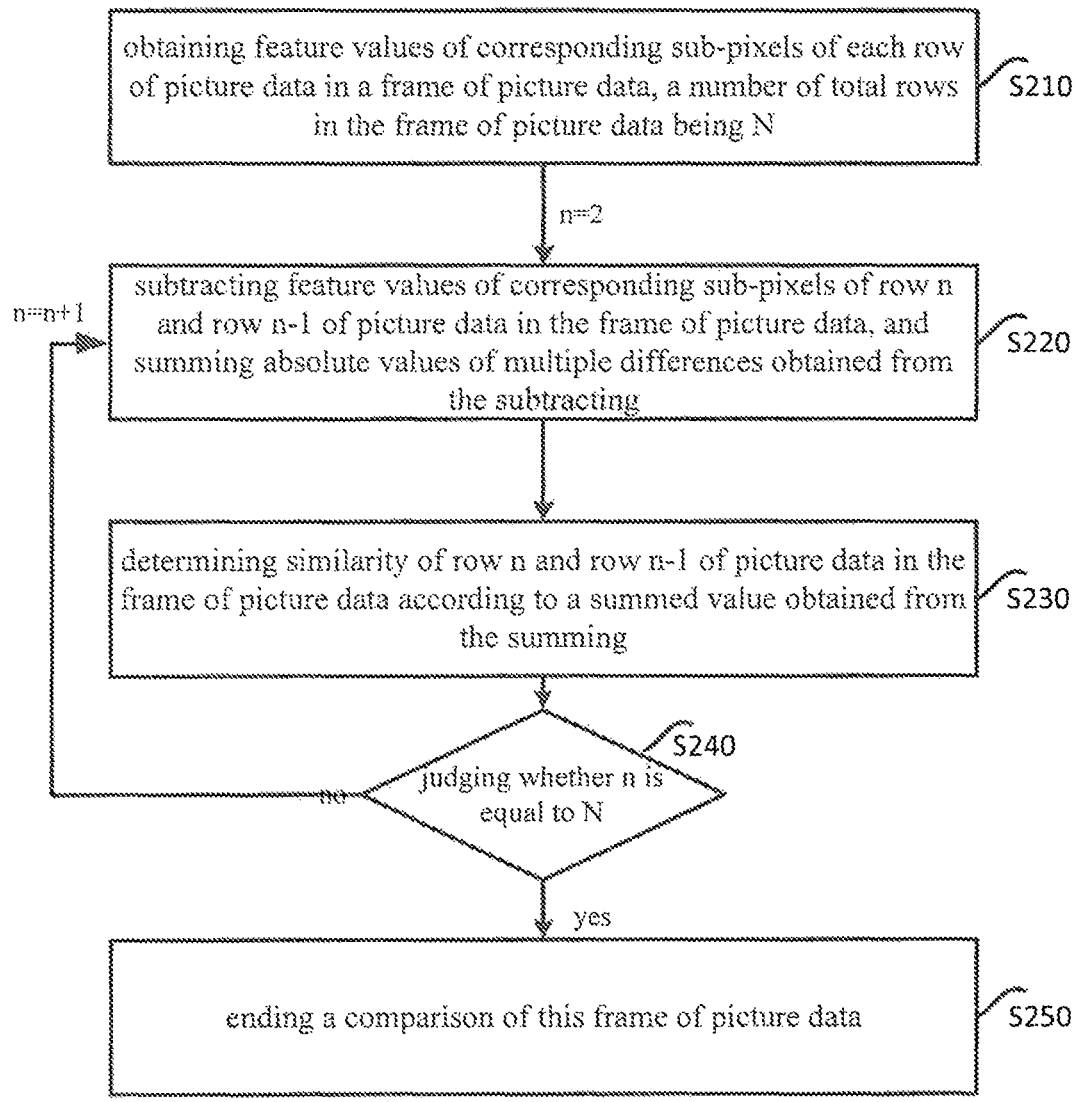
FIG. 2 is a flowchart of a method for determining similarity of adjacent rows in a picture according to an embodiment.

The embodiment of the present application further provides a method for determining similarity of adjacent rows in a picture, as shown in FIG. 2, the method includes:

Step S210, obtaining feature values of corresponding sub-pixels of each row of picture data in a frame of picture data, a number of total rows in the frame of picture data being N:

Step S220, subtracting feature values of corresponding sub-pixels of row n and row n−1 of picture data in the frame of picture data, and summing absolute values of multiple differences obtained from the subtracting;

Step S230, determining similarity of row a and row n−1 of picture data in the frame of picture data according to a summed value obtained from the summing;

Step S240, judging whether n equates to N, in determining that a equates to N, performing Step S250, in determining that n is not equal to N, increasing a by 1 that is n=n+1 and returning to Step S220 to repeat Step S220 to Step S240;

Step S250, ending a comparison of this frame of picture data;

Where an initial value of n is 2.

Specifically, firstly the feature values of corresponding sub-pixels of each row of picture data in a frame of picture data is obtained, and then the feature values of corresponding sub-pixel of row a and row n−1 of picture data in the frame of picture data is subtracted. Absolute values of multiple differences obtained from subtracting are summed, and similarity of row a and row n−1 of picture data is determined according to the summed value, and finally whether a equates to N is judged, and when n equates to N, the process is finished, otherwise n=n+1 and steps S220-S240 are repeated. The initial value of n is 2. The Similar(n) of all adjacent rows in the frame of picture data can be obtained by the above method, with n=2, 3, 4 . . . N.

By subtracting feature values of corresponding sub-pixels of two adjacent rows of picture data, and summing absolute values of multiple differences obtained from subtracting; and determining similarity of the two adjacent rows of picture data according to the summed value, and judging whether it is the last row, the method for determining similarity of adjacent rows in a picture in above embodiments can accurately and quickly determine similarity of all adjacent rows in the frame of picture data without increasing coat of the integrated circuit.

In one of embodiments, a feature value of a corresponding sub-pixel can include any one of gray value, chroma and brightness, etc. of the corresponding sub-pixel.

In one of embodiments, a feature value of a corresponding sub-pixel is a gray value of the corresponding sub-pixel. Adopting a gray value as the feature value can easily and quickly calculate a value of the feature value.

Figure 3:
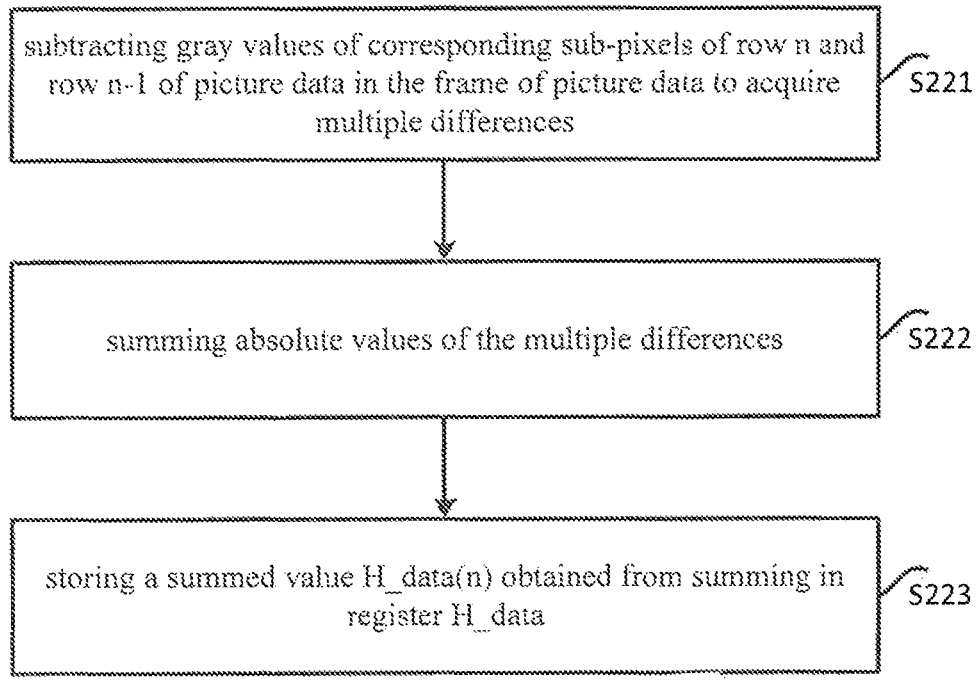
FIG. 3 is a flowchart of step S220 of the method of FIG. 2 according to an embodiment.

In one of embodiments, Step S210, obtaining feature values of corresponding sub-pixels of each row of picture data in a frame of picture data includes: calculating the gray values of the corresponding sub-pixels of each row of picture data in the frame of picture data to acquire the gray values of the corresponding sub-pixels of each row of picture data, Specifically, a feature value of a corresponding sub-pixel can be a gray values of the corresponding sub-pixel, thus Step S210 includes calculation of the gray values of the corresponding sub-pixels of picture data to acquire the gray values of the corresponding sub-pixels of each row of picture data, In one of embodiments, shown in FIG. 3, Step S220, subtracting the feature values of the corresponding sub-pixels of row n and row n−1 of picture data in the frame of picture data, and summing the absolute values of multiple differences obtained from subtracting includes:

Step S221, subtracting gray values of corresponding sub-pixels of row n and row n−1 of picture data in the frame of picture data to acquire multiple differences, a number of multiple differences equaling to a number of corresponding sub-pixels of each row of picture data in the frame of picture data.

Step S222, summing absolute values of the multiple differences,

Step S223, storing a summed value H_data(n) obtained from summing in register H_data.

Specifically, after the gray values of corresponding sub-pixels of each row of picture data in the frame of picture data are obtained, and the gray values of the corresponding sub-pixels of row n and row n−1 of picture data are subtracted, thereby obtaining multiple differences, a number of multiple differences equates to a number of the corresponding sub-pixels of a row of picture data. For measuring a difference between two rows of picture data, absolute values of multiple differences are summed here, and a summed value H_data(n) represents a total difference between the two rows of picture data. H_data(n) is stored in register H_data for reading in subsequent calculation processing.

Figure 4:
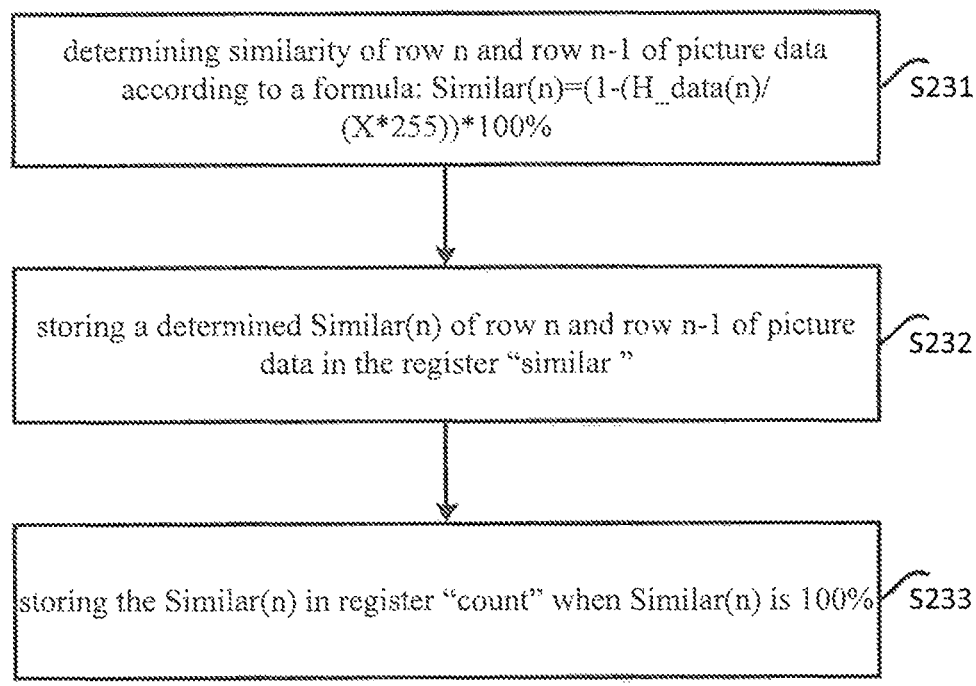
FIG. 4 is a flowchart of step S230 of the method of FIG. 2 according to an embodiment.

In one of embodiments, shown in FIG. 4, Step S230, determining a similarity of row n and row n−1 of picture data in the frame of picture data according to a summed value, includes:

Step S231, determining similarity of row n and row n−1 of picture data according to a formula: Similar(n)=(1−(H_data(n)/(X*255))*100%, with X represents a number of sub-pixels of a row of picture data in the frame of picture data.

After absolute values of multiple differences are summed, a Similar(n) of the two adjacent rows can be determined according to the summed value H_data(n). Specifically, similarity of the two adjacent rows of picture data can be determined according to the formula: Similar(n)=(1−(H_data(n)/(X*255))*100%, where Similar(n) is similarity of row n and row n−1 of picture data in the frame of picture data, where n=2, 3 . . . N, and N is a number of total rows in a frame of picture data, X is a number of sub-pixels of a row of picture data in the frame of picture data. Since a range of gray values is 0-255, a maximum difference between gray values of the two sub-pixels is 255. X*255 is a maximum absolute value of the differences between gray values of two adjacent rows of picture data. A ratio of the summed value and X*255 measures the differences of gray values of adjacent rows, and 1 subtracting the ratio can measure a similarity of the adjacent rows. For example. When H_data(n)=X*255, Similar(n) is 0, that is the two adjacent rows are completely different. When H_data(n)=0, Similar(n) is 100%, that is, the adjacent rows are completely identical. When H_data(n) is between 0 and X*255, Similar(n) is between 0 and 100% and represents a similarity of the two adjacent rows, the larger the value, the higher similarity of the adjacent rows will be.

Continuously referring to FIG. 4 in one of embodiments, Step S230, determining similarity of row n and row n−1 of picture data in the frame of picture data according to the summed value, further includes:

Step S232, storing a determined Similar(n) of row n and row n−1 of picture data in the register "similar".

Specifically, after calculating a similarity, whether to perform the subsequent picture processing can be determined according to the similarity. For example, when similarity of the two adjacent rows is larger, one of the two adjacent rows can be deleted. Therefore, it is necessary to store the determined Similar(n) of row n and row n−1 of picture data in register "similarity" for the subsequent picture processing. Similar(n) represents similarity, and n represents a serial number of rows to compare, for example, similarity (3)=80% represents that similarity of row 3 and row 2 is 80%.

Continuously referring to FIG. 4, in one of embodiments, Step S230, determining similarity of row n and row n−1 of picture data in the frame of picture data according to a summed value obtained from the summing, further includes:

Step S233, storing the Similar(n) in register "count" when Similar(n) is 100%.

Specifically, when similarity is 100%, it represents that the two rows of picture data are completely identical. When the similarity is 100%, then the value of the similarity is stored in register "count". In such way, if picture data need to he deleted or integrated, rows with similarity being 100% can be deleted or integrated preferentially.

Figure 5:
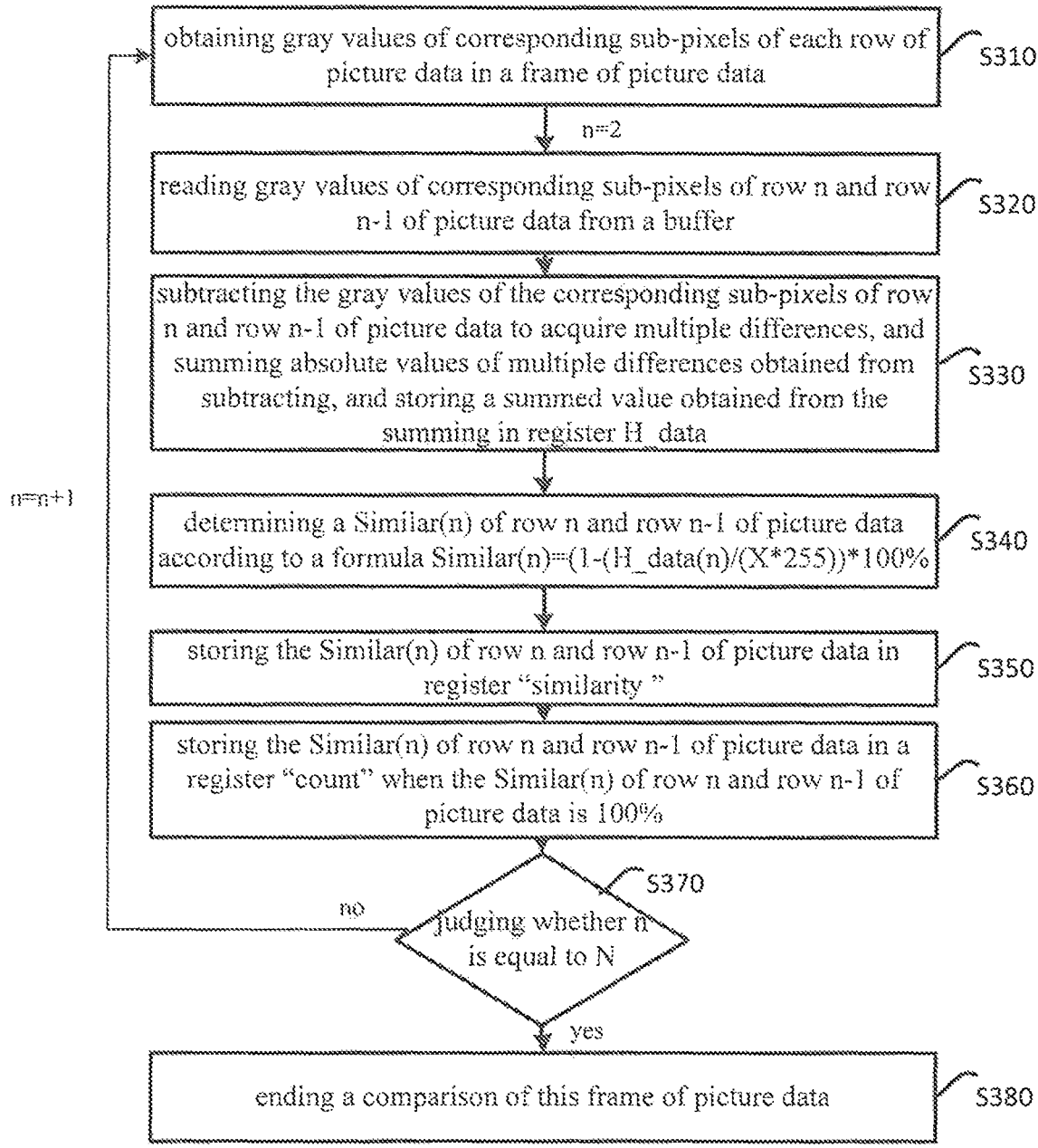
FIG. 5 is a flowchart of a method for determining similarity of adjacent rows in a picture according to an embodiment.

The embodiments of the present application further provide a method for determining similarity of adjacent rows in a picture, as shown in FIG. 5, the method includes:

Step S310, obtaining gray values of corresponding sub-pixels of each row of picture data in a frame of picture data;

Step S320, reading gray values of corresponding sub-pixels of row n and row n−1 of picture data from a buffer;

Step S330, subtracting the gray values of the corresponding sub-pixels of row n and row n−1 of picture data to acquire multiple differences, and summing absolute values of multiple differences obtained from subtracting, and storing a summed value obtained from the summing in register H_data, Step S340, determining a Similar(n) of row n and row n−1 of picture data according to a formula Similar(n)=(1−(H_data(n)/(X*255))*100%;

Step S350, storing the Similar(n) of row a and row n−1 of picture data in register "similarity";

Step S360, storing the Similar(n) of row n and row n−1 of picture data in a register "count" when the Similar(n) of row n and row n−1 of picture data is 100%;

Step S370, judging whether a equates to N, in determining that n equates to N, performing Step S380, otherwise increasing a by 1 that is n=n+1 and returning to Step S320 to repeat Step S320 to Step S370; and Step S380, ending a comparison of this frame of picture data where an initial value of n is 2.

The above method for determining similarity of adjacent rows in a picture, by subtracting gray value of corresponding sub-pixels of two adjacent rows of picture data, and summing absolute values of multiple differences obtained from subtracting, and determining similarity of the two adjacent rows according to a summed value obtained from the summing, and judging whether it is the last row, thereby accurately and quickly determining similarity of all adjacent rows in a flame of picture data without increasing cost of the integrated circuit.

In one of embodiments, obtaining gray values of corresponding sub-pixels of picture data in a frame of picture data, includes: calculating gray values of corresponding sub-pixels of each row of picture data in the frame of picture data to acquire the gray values of the corresponding sub-pixels of each row of picture data.

It should he understood that although each step in the flowchart of FIGS. 1-5 are shown in sequence as indicated by the arrows, these steps are not necessarily executed in the order indicated by the arrows. Unless explicitly stated herein, the execution of these steps is not strictly limited to the order, and can be executed in other orders. Moreover, at least part of the steps in FIGS. 1-5 can include multiple sub-steps or multiple stages. These sub-steps or stages are not necessarily executed at the same time, but can he executed at different times, and the sub-steps or stages are not necessarily performed sequentially, but can be performed in turn or alternately with at least part of other steps or sub-steps of the other steps or stages of the other steps.

The present application also provides a display device, includes a apparatus for determining the similarity of adjacent rows in a picture, the apparatus includes a processor and a memory, and the processor configured to execute a computer program stored in the memory to implement the following steps: obtaining feature values of corresponding sub-pixels of each row of picture data in a frame of picture data; subtracting feature values of corresponding sub-pixels of two adjacent rows of picture data in the frame of picture data, and summing absolute values of multiple differences obtained from the subtracting, and determining similarity of the two adjacent rows of picture data in the frame of picture data according to a summed value obtained from the summing.

In one of embodiments, a feature value of a corresponding sub-pixel includes any one of a gray value, chroma and brightness, etc. of the corresponding sub-pixel.

In one of embodiments, a feature value of a corresponding sub-pixel is a gray value of the corresponding sub-pixel. Abtaining feature values of the corresponding sub-pixels of each row of picture data in a frame of picture data, includes: calculating gray values of corresponding sub-pixels of each row of picture data in a frame of picture data to acquire the gray values of the corresponding sub-pixels of each row of picture data.

In one of embodiments, subtracting feature values of corresponding sub-pixels of two adjacent rows of picture data in the frame of picture data, and summing absolute values of multiple differences obtained from subtracting includes:

subtracting the gray values of the corresponding sub-pixels of the two adjacent rows of picture data in the frame of picture data to acquire multiple differences, a number of multiple differences equaling to a number of corresponding sub-pixels of a row of picture data in the frame of picture data; and summing absolute values of multiple differences obtained from the subtracting.

In one of embodiments, determining similarity of the two adjacent rows of picture data in the frame of picture data according to a summed value obtained from the summing includes; determining similarity of the two adjacent rows of picture data according to formula Similar(n)=(1−(1−(H_data(n)/(X*255))x100%. Where Similar(n) is similarity of row n and row n−1 of picture data in the frame of picture data, N=2, 3 . . . N, with N is a number of total rows in the frame of picture data, H_data(n) is a value obtained by summing absolute values of differences obtained from subtracting gray values of corresponding sub-pixels of row it and row n−1 of picture data, X is a number of sub-pixels of a row of picture data in a frame of picture data.

In one of embodiments, the display device includes liquid crystal displays or organic light-emitting diode (OLED) displays.

The technical features in the above-mentioned embodiments can be combined arbitrarily. For more simple description, all possible combinations of the various technical features in the above-mentioned embodiments are not described. However, as long as there are no contradiction in the combination of these technical features, all should be considered to be within the scope described in this description.

The above-mentioned embodiments only express a few implementation modes of the present application, and their descriptions are more specific and detailed, but they should not be interpreted as a limitation on the scope of patents. It should be pointed out that for one of ordinary skill in the art, several modifications and improvements, which all fall within the protection scope of the present application can be made, without departing from the concept of the present application. Therefore, the protection scope of the present application shall be subject to the appended claims.

What is claimed is:

1. A method for determining similarity of adjacent rows in a picture, comprising:
   obtaining feature values of corresponding sub-pixels of each row of picture data in a frame of picture data;
   subtracting feature values of corresponding sub-pixels of two adjacent rows of picture data in the frame of picture data, and summing absolute values of multiple differences obtained from the subtracting; and
   determining similarity of the two adjacent rows of picture data in the frame of picture data according to a summed value obtained from the summing,
   wherein a number of the multiple differences equates to a number of corresponding sub-pixels of a row of picture data, and
   a summed value obtained from summing the absolute values of the multiple differences represents a total difference between the two rows of picture data.

2. The method according to claim 1, wherein a feature value of a corresponding sub-pixel comprising any one of a gray values, chroma and brightness of the corresponding sub-pixel.

3. The method according to claim 1, wherein a feature value of a corresponding sub-pixel is a gray value of the corresponding sub-pixel.

4. The method according to claim 3, wherein "obtaining feature values of corresponding sub-pixels of each row of picture data in a frame of picture data" comprises:
   calculating the gray values of the corresponding sub-pixels of each row of picture data in the frame of picture data to acquire the gray values of the corresponding sub-pixels of each row of picture data.

5. The method according to claim 3, wherein "subtracting feature values of corresponding sub-pixels of two adjacent rows of picture data in the frame of picture data, and summing absolute values of multiple differences obtained from the subtracting" comprises:
   subtracting gray values of corresponding sub-pixels of two adjacent rows of picture data in the frame of picture data to acquire multiple differences, a number of multiple differences equaling to a number of corresponding sub-pixels of a row of picture data in the frame of picture data; and
   summing absolute values of the multiple differences.

6. The method according to claim 5, wherein "determining similarity of the two adjacent rows of picture data in the frame of picture data according to a summed value obtained from the summing" comprises:
   determining similarity of the two adjacent rows of picture data according to a formula Similar $(n)=(1-(H\_data(n)/(X*255)))*100\%$,
   wherein Similar(n) is similarity of row n and row n−1 of picture data in the frame of picture data, n=2, 3, ... N, wherein N is a number of total rows in the frame of picture data, H_data(n) is a value obtained by summing absolute values of differences obtained from subtracting gray values of corresponding sub-pixels of row n and row n−1 of picture data, X is a number of sub-pixels of a row of picture data in the frame of picture data.

7. A method for determining similarity of adjacent rows in a picture, comprising:
   obtaining feature values of corresponding sub-pixels of each row of picture data in a frame of picture data, a number of total rows in the frame of picture data being N;
   subtracting feature values of corresponding sub-pixels of row n and row n−1 of picture data in the frame of picture data, and summing absolute values of multiple differences obtained from the subtracting;
   determining similarity of the row n and row n−1 of picture data in the frame of picture data according to a summed value obtained from the summing; and
   judging whether n equates to N, in determining that n equates to N, ending processing, in determining that n is not equal to N, increasing n by 1 that is n=n+1 and returning to "subtracting feature values of corresponding sub-pixels of row n and row n−1 of picture data in the frame of picture data, and summing absolute values of multiple differences obtained from the subtracting";
   wherein an initial value of n is 2.

8. The method according to claim 7, wherein a feature value of a corresponding sub-pixel comprising any one of gray values, chroma and brightness of the corresponding sub-pixel.

9. The method according to claim 7, wherein a feature value of a corresponding sub-pixel is a gray value of the corresponding sub-pixel.

10. The method according to claim 9, wherein "obtaining feature values of corresponding sub-pixels of each row of picture data in a frame of picture data" comprises:
    calculating gray values of corresponding sub-pixels of each row of picture data in the frame of picture data to acquire gray values of corresponding sub-pixels of each row of picture data.

11. The method according to claim 10, wherein the subtracting feature values of corresponding sub-pixels of row n and row n−1 of picture data in the frame of picture data, and summing absolute values of multiple differences obtained from the subtracting, comprising:
    subtracting gray values of corresponding sub-pixels of row n and row n−1 of picture data in the frame of picture data to acquire multiple differences, a number of multiple differences equaling to a number of corresponding sub-pixels of a row of picture data in the frame of picture data;
    summing absolute values of multiple differences; and
    storing the summed value H_data(n) obtained from the summing in register H_data.

12. The method according to claim 11, wherein the determining similarity of the row n and row n−1 of picture data in the frame of picture data according to a summed value obtained from the summing, comprising:

determining similarity of the row n and row n−1 of picture data according to a formula Similar (n)=(1−(H_data(n)/(X*255))*100%, wherein X is a number of a row of picture data in the frame of picture data.

13. The method according to claim 12, wherein "determining similarity of the row n and row n−1 of picture data in the frame of picture data according to a summed value obtained from the summing", further comprises:

Storing a determined Similar(n) of the row n and row n−1 of picture data in register similarity.

14. The method according to claim 13, wherein the determining similarity of the row n and row n−1 of picture data in the frame of picture data according to a summed value obtained from the summing, further comprising:

storing the Similar(n) in register count when a value of the Similar(n) is 100%.

15. A display device, comprising an apparatus for determining similarity of adjacent rows in a picture, the apparatus comprising: a processor and a memory, and the processor configured to execute a computer program stored in the memory to implement the following steps:

obtaining feature values of corresponding sub-pixels of each row of picture data in a frame of picture data;

subtracting feature values of corresponding sub-pixels of two adjacent rows of picture data in the frame of picture data, and summing absolute values of multiple differences obtained from the subtracting; and determining similarity of the two adjacent rows of picture data in the frame of picture data according to a summed value obtained from the summing.

16. The display device according to claim 15, wherein a feature value of a corresponding sub-pixel comprising any one of a gray value, chroma and brightness of the corresponding sub-pixel.

17. The display device according to claim 15, wherein a feature value of a corresponding sub-pixel is a gray value of the corresponding sub-pixel, "obtaining feature values of corresponding sub-pixels of a row of picture data in a frame of picture data", comprises:

calculating gray values of the corresponding sub-pixels of each row of picture data in the frame of picture data to acquire the gray values of the corresponding sub-pixels of each row of picture data.

18. The display device according to claim 17, wherein "subtracting feature values of corresponding sub-pixels of two adjacent rows of picture data in the frame of picture data, and summing absolute values of multiple differences obtained from the subtracting" comprises:

subtracting gray values of corresponding sub-pixels of two adjacent rows of picture data in the frame of picture data to acquire multiple differences, a number of multiple differences equaling to a number of corresponding sub-pixels of a row of picture data in the frame of picture data; and summing absolute values of multiple differences.

19. The display device according to claim 18, wherein the determining similarity of the row n and row n−1 of picture data in the frame of picture data according to a summed value obtained from the summing, comprising:

determining similarity of the two adjacent rows of picture data according to a formula Similar (n)=(1−(H_data(n)/(X*255))*100%, wherein Similar(n) is similarity of row n and row n−1 of picture data in the frame of picture data, n=2, 3, . . . N, wherein N is number of total rows in the frame of picture data, H data(n) is a value obtained by summing absolute values of differences obtained from subtracting gray values of corresponding sub-pixels of row n and row n−1 of picture data, X is a number of sub-pixels of a row of picture data in a frame of picture data.

20. The display device according to claim 15, wherein comprising liquid crystal displays or organic light-emitting diode (OLED) displays.

\* \* \* \* \*